United States Patent
Bartoszewski et al.

(10) Patent No.: US 9,473,458 B2
(45) Date of Patent: *Oct. 18, 2016

(54) CONNECTION CONFIGURATION

(71) Applicant: INTERNATIONAL BUSINESS MACHINES CORPORATION, Armonk, NY (US)

(72) Inventors: Michal Bartoszewski, Koszalin (PL); Miguel A. Beher Valdivia, Roswell, GA (US); Zachary S. Herman, South Weber, UT (US); Kaleb D. Walton, Fenton, MI (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/851,465

(22) Filed: Sep. 11, 2015

(65) Prior Publication Data
US 2016/0006694 A1    Jan. 7, 2016

Related U.S. Application Data

(63) Continuation of application No. 14/274,831, filed on May 12, 2014, now Pat. No. 9,197,671.

(51) Int. Cl.
*G06F 9/00* (2006.01)
*H04L 29/06* (2006.01)
*H04L 12/24* (2006.01)
(Continued)

(52) U.S. Cl.
CPC ........... *H04L 63/0263* (2013.01); *H04L 12/24* (2013.01); *H04L 41/0813* (2013.01); *H04L 63/02* (2013.01); *H04L 63/08* (2013.01); *H04L 63/10* (2013.01); *H04L 63/20* (2013.01);
(Continued)

(58) Field of Classification Search
CPC H04L 63/0492; H04W 12/06; H04W 28/18; H04W 76/02; H04W 92/10
USPC .............................................. 726/1; 380/270
See application file for complete search history.

(56) References Cited

U.S. PATENT DOCUMENTS

| 7,570,939 B2* | 8/2009 | Culbert ............... H04L 63/0492 455/3.03 |
| 8,813,198 B2 | 8/2014 | Louboutin et al. |

(Continued)

OTHER PUBLICATIONS

AppleInsider; Apple may turn to RFID tags for easy Wi-Fi setup; Retrieved from the Internet URL http://appleinsider.com/articles/07/03/08/apple_may_turn_to_rfid_tags_for_easy_wi_fi_setup; retrieved Jan. 27, 2014; 16 pages.

(Continued)

*Primary Examiner* — Samson Lemma
(74) *Attorney, Agent, or Firm* — Schmeiser, Olsen & Watts; Matthew Chung

(57) ABSTRACT

A connection method is provided. The method includes retrieving by a data retrieval device, unique data comprising an identifier associated with a wireless device. The unique data is transmitted to a router transmitting an authorization request and a configuration request for a configuration change to an authorization service. The authorization request is presented to a user and in response the user transmits an authorization code to the authorization service. In response, the router generates a virtual SSID and preconfigured firewall rules based on the unique data and the wireless device is automatically connected to the router based on the virtual SSID and the preconfigured firewall rules.

20 Claims, 4 Drawing Sheets

(51) Int. Cl.
*H04W 12/06* (2009.01)
*H04W 76/02* (2009.01)
*H04W 84/12* (2009.01)

(52) U.S. Cl.
CPC ............. *H04W12/06* (2013.01); *H04W 76/02* (2013.01); *H04W 84/12* (2013.01)

(56) References Cited

U.S. PATENT DOCUMENTS

| | | |
|---|---|---|
| 9,197,671 B1 | 11/2015 | Bartoszewski et al. |
| 2008/0115071 A1 | 5/2008 | Fair |
| 2012/0287817 A1* | 11/2012 | Yamaguchi ......... H04L 41/0853 370/254 |
| 2013/0014232 A1* | 1/2013 | Louboutin ........ H04M 1/72527 726/5 |
| 2013/0225204 A1* | 8/2013 | Mathews ........... H04N 21/4126 455/456.3 |

OTHER PUBLICATIONS

Mancuso et al.; Protocol to Access White-space (PAWS) Databases: Use Cases and Requirements; Internet Engineering Task Force (IETF) Request for Comments: 6953; May 1, 2013; 24 pages.

Ng et al.; Analysis of Multihoming in Network Mobility Support; Network Working Group Request for Comments: 4980; Oct. 1, 2007; 41 pages.

Shon et al.; Improved RF4CE key agreement approach involving two-phase key distribution for smart-convergence home device; Security and Communication Networks; vol. 5 No. 9; Sep. 2012; pp. 974-986.

Friedman, Mark J.; List of IBM Patents or Patent Applications Treated as Related; Sep. 11, 2015; 1 page.

* cited by examiner

CONNECTION CONFIGURATION

This application is a continuation application claiming priority to Ser. No. 14/274,831 filed May 12, 2014, now U.S. Pat. No. 9,197,671, issued Nov. 24, 2015.

FIELD

The present invention relates generally to a method for automatically connecting a device to a router, and in particular to a method and associated system for generating a virtual Wi-Fi network for automatically connecting a device to a router

BACKGROUND

Connecting devices typically includes an inaccurate process with little flexibility. Configuring connections may include a complicated process that may be time consuming and require a large amount of resources. Accordingly, there exists a need in the art to overcome at least some of the deficiencies and limitations described herein above.

SUMMARY

A first aspect of the invention provides a method comprising: retrieving, by a computer processor of a data retrieval device from a wireless device, unique data comprising an identifier associated with the wireless device; transmitting, by the computer processor, the unique data to a wireless router, wherein the wireless router transmits an authorization request and a configuration request for a configuration change to an authorization service; receiving, by the computer processor from the authorization service, an authorization request; presenting, by the computer processor to a user, the authorization request; receiving, by the computer processor from the user in response to the authorization request, an authorization code; and transmitting, by the computer processor to the authorization service, the authorization code, wherein the authorization service transmits an authorization approval, based on the authorization code, to the wireless router, wherein the wireless router generates a virtual SSID and preconfigured firewall rules based on the unique data, wherein the virtual SSID and the preconfigured firewall rules are only associated with the wireless router and the wireless device, and wherein the wireless device is automatically connected to the wireless router based on the virtual SSID and the preconfigured firewall rules.

A second aspect of the invention provides a method comprising: retrieving, by a computer processor of a data retrieval device from a rewritable/scannable tag integrated with a wireless device, unique data comprising an identifier associated with the wireless device; transmitting, by the computer processor, an authorization request to a wireless router; transmitting, by the computer processor, the unique data to a wireless router, wherein the wireless router determines that the wireless device is authorized for connection to the wireless router based on the authorization request and the unique data; transmitting, by the computer processor to the wireless router, a connection command, wherein the wireless router generates a virtual wireless network comprising a virtual SSID and preconfigured firewall rules based on the unique data and in response to the connection command, wherein the virtual wireless network, the virtual SSID, and the preconfigured firewall rules are only associated with the wireless router and the wireless device, and wherein the wireless device is automatically connected to the wireless router via the virtual wireless network based on the virtual SSID and the preconfigured firewall rules.

A third aspect of the invention provides a computer program product for configuring a connection, the computer program product comprising: one or more computer-readable, tangible storage devices; program instructions, stored on at least one of the one or more storage devices, to retrieve by a computer processor of a data retrieval device from a wireless device, unique data comprising an identifier associated with the wireless device; program instructions, stored on at least one of the one or more storage devices, to transmit the unique data to a wireless router, wherein the wireless router transmits an authorization request and a configuration request for a configuration change to an authorization service; program instructions, stored on at least one of the one or more storage devices, to receive from the authorization service, an authorization request; program instructions, stored on at least one of the one or more storage devices, to present the authorization request to a user; program instructions, stored on at least one of the one or more storage devices, to receive an authorization code from the user in response to the authorization request; and program instructions, stored on at least one of the one or more storage devices, to transmit the authorization code to the authorization service, wherein the authorization service transmits an authorization approval, based on the authorization code, to the wireless router, wherein the wireless router generates a virtual SSID and preconfigured firewall rules based on the unique data, wherein the virtual SSID and the preconfigured firewall rules are only associated with the wireless router and the wireless device, and wherein the wireless device is automatically connected to the wireless router based on the virtual SSID and the preconfigured firewall rules.

The present invention advantageously provides a simple method and associated system capable of connecting devices.

DETAILED DESCRIPTION

Figure 1:
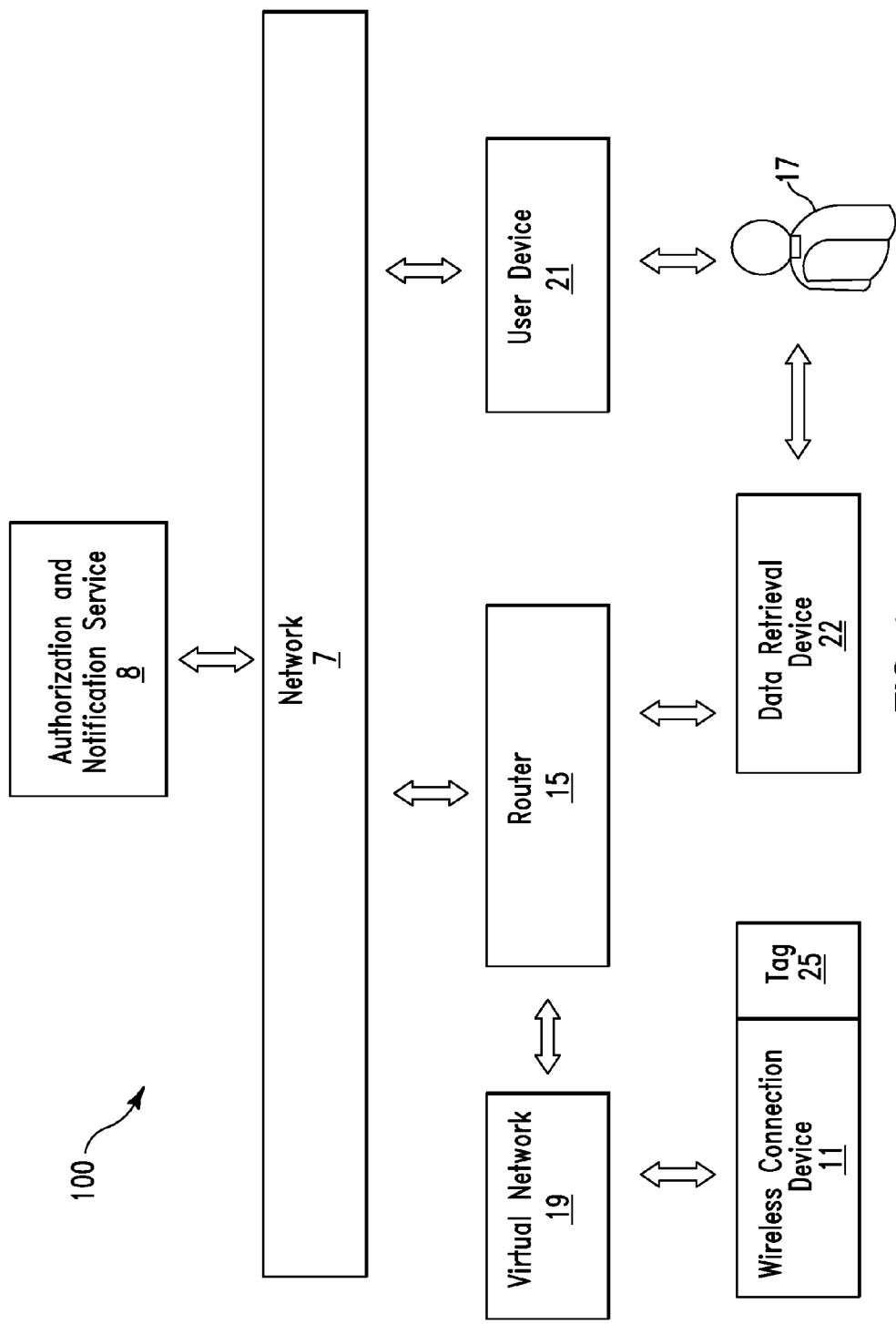
FIG. 1 illustrates a system enabling an automatic configuration and connection of a wireless device to a wireless router, in accordance with embodiments of the present invention.

FIG. 1 illustrates a system 100 for enabling an automatic configuration and connection of a wireless connection device 11 to a wireless router 15, in accordance with embodiments of the present invention. The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

System 100 enables a wireless (e.g., WIFI) router 15 to collect (e.g., from a scanning RFID tag, a QR code, a bar code etc.) specific security related configuration data (e.g., firewall rules, network workgroup names, etc.) from a wireless collection device 11 and authorize a request to configure a secure connection to the router via a notification and response system that interacts with a user 17. Additionally, system 100 may collect (e.g., from a scanning RFID tag, a QR code, a bar code etc.) device information (associated with the wireless connection device 11) comprising a unique identifier (e.g., a service set identifier (SSID)), product information (e.g., a serial number), a pre-shared key, firewall rules and other device-specific security configuration data, etc. Firewall rules may be pre-configured by a vendor based on IP addresses of command and control (CNC) servers on the Internet and enabled ports allowing a wireless device (a wireless connectable toy such as a teddy bear) to communicate with the CNC servers as well as required ports on an associated firewall within a user' wireless router used by the CNC servers to connect to the wireless device. For example, if a vendor has a CNC server at 1.2.3.4 and an opened port 4321 for a WIFI enabled teddy bears to access and the vendor decides to communicate with the WIFI teddy bear on port 9876, then a firewall rule configuration would specify: Allow Outbound to 1.2.3.4 through port 4321 and allow Inbound from 1.2.3.4 through port 9876. Example of device-specific security configuration data may include authorization credentials to a CNC server (e.g., a token or key or a unique identifier for the CNC server) to identify a wireless device.

In response to system 100 collecting device information, wireless router 15 generates a new and completely restricted virtual network 19 using the unique identifier as a unique non-broadcasting SSID (i.e., known only to router 15 and the wireless connection device 11) thereby allowing access to the restricted virtual network based on collected firewall rules and other device-specific security configuration data. Access or changes in security configuration to the restricted virtual network may be authenticated by a router providing a notification service (e.g., a PIN via email) to user 17 of wireless connection device 11. Alternatively, wireless router 15 may remove the restricted virtual network in response to detecting a disconnect or timeout command with respect to a wireless connection to the restricted virtual network. Additionally, system 100 enables wireless connection device 11 to generate a new SSID and overwrites an existing SSID in the RFID, QR code, or bar code in response to disconnecting from the restricted virtual network.

System 100 of FIG. 1 includes a wireless router 15 communicatively connected to a wireless connection device 11 (including a scannable tag 25), a data retrieval device 22, and a network 7. System 100 additionally comprises a user device 21 and an authorization and notification service 8 connected to network 7. Wireless router 15 enables a connection between network 7 and wireless connection device 11 and data retrieval device 22. Network 7 may include any type of network including, inter alia, a local area network, (LAN), a wide area network (WAN), the Internet, a wireless network, etc. Wireless connection device 11 may include any type of wireless connectable device including, inter alia, a computer, a tablet computer, a wireless connectable toy, etc. Scannable tag 25 may be integrated with wireless connection device 11. For example, scannable tag 25 may be mounted to or within any portion of wireless connection device 11. Scannable tag 25 may include any type of scannable tag that includes information. For example, scannable tag may include an RFID tag, a quick response (QR) code tag, a bar code tag, etc. Data retrieval device 22 may comprise, inter alia, an RFID reading wand, a smartphone, a barcode scanner, any type of device for scanning scan scannable tags, etc. User device 21 may comprise, inter alia, a smartphone, a computer, etc. Alternatively, data retrieval device 22 and user device 21 may comprise a same device. Authorization and notification service 8 may comprise a notification and response system that includes a cloud service tied to a smart phone, email account, router 15 via SMS, etc.

System 100 of FIG. 1 a method for configuring wireless connection device 11 automatically connect to a dynamically generated virtual WIFI network 19 (via router 15) broadcasting a unique SSID that restricted to only to router 15 and wireless connection device 11. Additionally, system 100 enables a method for authorizing a specific firewall rule for implementation in a completely locked down gateway (i.e., to increase security on virtual network 19). Authorizing a specific firewall rule may additionally be used to authorize access to a local workgroup to bridge virtual network 19 with a primary network (e.g., network 17). Furthermore, system 100 enables a disconnect function or timeout function to prompt wireless connection device 11 to generate a new SSID for subsequent use.

System 100 enables a process for generating an automatic configuration connection of wireless connection device 11 to wireless router 15 as follows:

1. A user scans scannable tag 25 using data retrieval device 22.
2. Data retrieval device 22 retrieves a unique id, product information, a pre-shared key, a firewall rule, etc. from scannable tag 25.
3. Data retrieval device 22 transmits the retrieved (i.e., from step 2) information to wireless router 15 and it is determined if the data retrieval device 22 is authorized for connection. If data retrieval device 22 is authorized for connection then step 8 is executed as described, infra. If data retrieval device 22 is not authorized for connection then steps 4-10 are executed as described, infra.
4. Router 15 transmits an authorization request to authorization and notification service 8. The authorization request comprises a requested configuration change.
5. User device 21 receives a notification requesting authorization in response to the authorization request.
6. User 17 inputs a response and personal ID into user device 21.
7. Authorization and notification service 8 transmits a response to router 15.
8. Router 15 generates a virtual SSD with preconfigured firewall rules.
9. Wireless connection device 11 automatically connects to router 15 and remains connected and active until a disconnect command resulting in wireless connection device 11 disconnecting from router 15 and a complete teardown of all configuration information if wireless connection device 11 is determined to comprise a transient device.

The following implementation example illustrates a connection process (enabled by system 100) for automatically connecting a wireless Internet connectable child's toy (e.g., wireless connection device 11) to a router (e.g., router 15) via a virtual private network (e.g., virtual network 19). A user (e.g., user 17) purchases a wireless connection device (e.g., a stuffed connectable bear) without batteries. The user brings the wireless connection device home and waves a data retrieval wand over the wireless connection device and in response the data retrieval wand retrieves (from a scannable tag 25 on the wireless connection device) information including a unique identifier (i.e., to be used as virtual, non-broadcasting SSID), product information associated with the wireless connection device (e.g., product name, description, etc.), a pre-shared key, and a firewall rule. The retrieved information is transmitted to router 15 and in response the router generates new completely restricted virtual network (e.g., virtual network 19) using the unique identifier as a non-broadcasting SSID and only allowing internet access based on the retrieved firewall rule. Router 15 transmits an authentication request to a notification service (e.g., authorization and notification service 8) that transmits the authentication request to a smartphone (i.e., user device 21). In response, user 17 inputs (into the smartphone) an authentication key (e.g. PIN) thereby validating that the wireless connection device is authorized to connect to router 15 based on the firewall rule. At a later time period, batteries are installed into the wireless connection device and the wireless connection device is enabled. In response, the wireless connection device attempts to connect router 15 using the previously generated unique identifier as the SSID and the pre-shared key as authentication. Router authenticates the wireless connection device using the pre-shared key and allows it on the restricted virtual network 19. In response, the wireless connection device receives instructions from network 7 and initiates intended functions. Additionally, user 17 may remotely (e.g., via a computer) enable functions of the wireless connection device.

The following implementation example illustrates a connection process (enabled by system 100) for automatically connecting a tablet computer (e.g., wireless connection device 11) in an airport to a router (e.g., router 15) via private virtual network (e.g., virtual network 19). In this example, a traveler (e.g., 17) in an airport approaches a WIFI access scanning station (e.g., data retrieval device 22 and/or user device 21) and places the tablet computer adjacent to the scanning station. In response, the scanning station scans a scannable tag (e.g., tag 25) integrated with the tablet computer. The scannable tag comprises an SSID and a NIC MAC address for the tablet computer. The scanning station instructs the WIFI router to generate a new private virtual network using the tablet computer's SSID. Access to the new private virtual network is restricted to the tablet computer's MAC address. The tablet computer is automatically connected to the private virtual network. When the traveler boards an airplane and moves out of range from the WIFI router, the WIFI router detects disconnect or timeout and flushes virtual network from the system. The disconnect or timeout is detected by the tablet computer and a new SSID is generated. The new SSID overwrites existing SSID (on the scannable tag) for next usage of the tablet computer.

Figure 2:
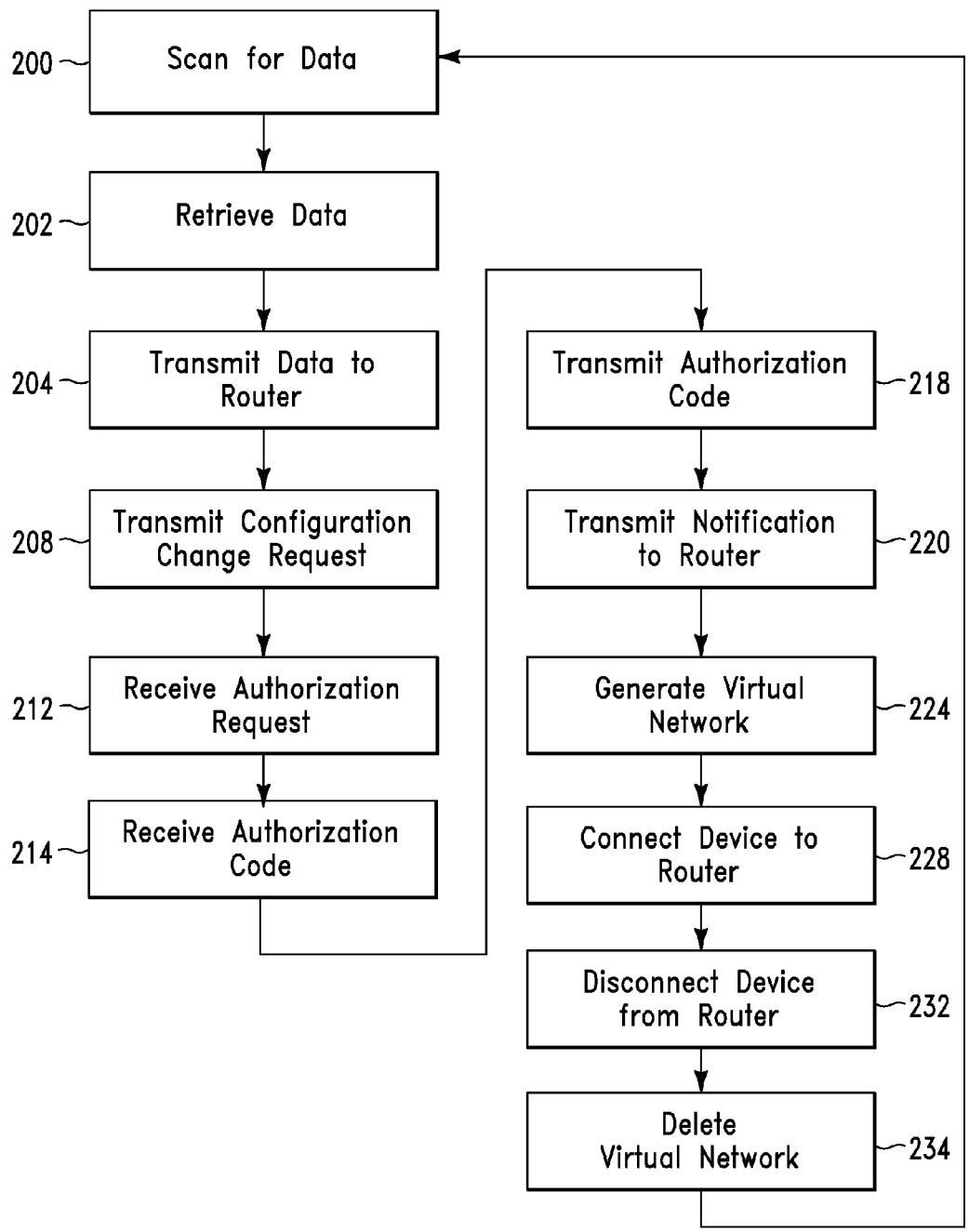
FIG. 2 illustrates an algorithm detailing a process flow enabled by the system of FIG. 1 enabling an authorization service to provide an automatic connection of a wireless device to a wireless router, in accordance with embodiments of the present invention.

FIG. 2 illustrates an algorithm detailing a process flow enabled by system 100 of FIG. 1 enabling an authorization service to provide an automatic connection of a wireless connection device to a wireless router, in accordance with embodiments of the present invention. Each of the steps in the algorithm of FIG. 2 may be enabled and executed in any order by a computer processor executing computer code. In step 200, a scannable tag integrated with a wireless connection device is scanned (by a data retrieval device) for data. In step 202, unique data is retrieved from the tag. The unique data comprises an identifier associated with the wireless connection device. Additionally, the data retrieval device may retrieve additional data from the scannable tag. The additional data may include, inter alia, product information associated with the wireless connection device, a pre-shared key, a firewall rule(s), etc. In step 204, the unique data and/or the additional data is transmitted to a wireless router. In step 208, the wireless router transmits (in response to step 204) an authorization notification and a configuration request for a configuration change to an authorization service. In step 212, the data retrieval device receives (from the authorization service) and presents (to a user) an authorization request. In step 214, the data retrieval device receives (in response to the authorization request) an authorization code from the user. In step 218, the authorization code is transmitted to the authorization service. In step 220, the authorization service transmits (to the wireless router) an authorization approval notice based on the authorization code. In step 224, the wireless router generates (in response to the authorization approval notice) a private virtual network comprising a virtual SSID and preconfigured firewall rules based on the unique data and/or the additional data. The private virtual network comprising the virtual SSID and the preconfigured firewall rules is only associated with the wireless router and the wireless connection device. In step 228, wireless connection device is automatically connected to the wireless router based on the virtual SSID and the preconfigured firewall rules. In step 232, the wireless connection device is disconnected from the wireless router and it is determined that the wireless communication device comprises a transient device. In step 234, the wireless router deletes the private virtual network (including the virtual SSID and the preconfigured firewall rules and step 200 is repeated. Additionally, the wireless connection device may generate an updated virtual network comprising an updated virtual SSID and updated preconfigured firewall rules. The updated virtual network differs from the original virtual network. In response, the original unique data may be removed from the scannable tag and the updated virtual SSID and updated preconfigured firewall rules may be placed on the scannable tag for future connection usage.

Figure 3:
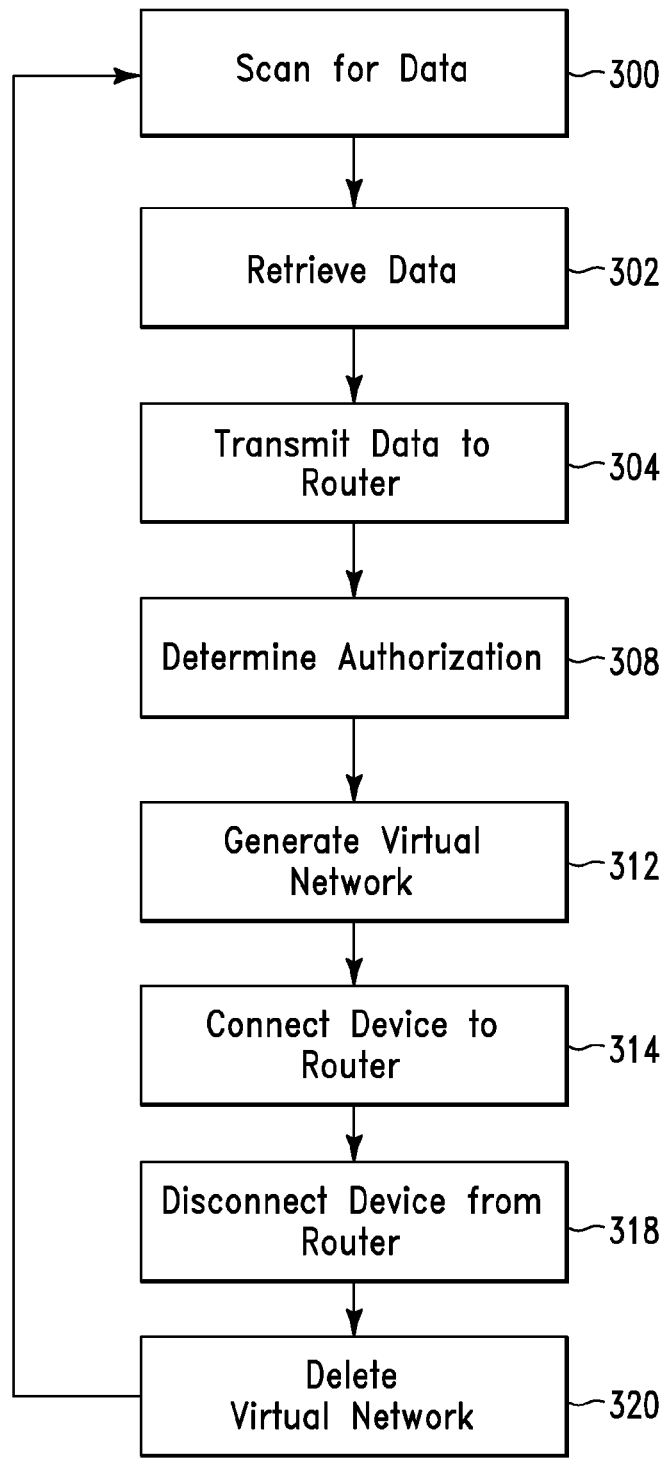
FIG. 3 illustrates an algorithm detailing a process flow enabled by the system of FIG. 1 enabling a data retrieval device to provide an automatic connection of a wireless device to a wireless router, in accordance with embodiments of the present invention.

FIG. 3 illustrates an algorithm detailing a process flow enabled by system 100 of FIG. 1 enabling a data retrieval device to provide an automatic connection of a wireless connection device to a wireless router, in accordance with embodiments of the present invention. Each of the steps in the algorithm of FIG. 3 may be enabled and executed in any order by a computer processor executing computer code. In step 300, a scannable tag integrated with a wireless connection device is scanned (by a data retrieval device) for data. In step 302, unique data is retrieved from the tag. The unique data comprises an identifier associated with the wireless connection device. Additionally, the data retrieval device may retrieve additional data from the scannable tag. The additional data may include, inter alia, product information associated with the wireless connection device, a pre-shared key, a firewall rule(s), etc. In step 304, the unique data and/or the additional data is transmitted to a wireless router. In step 308, it is determined that the data retrieval device is authorized to provide a connection authorization for connection to the wireless router. In step 312, the wireless router generates (in response to the connection authorization of step 308) a private virtual network comprising a virtual SSID and preconfigured firewall rules based on the unique data and/or the additional data. The private virtual network comprising the virtual SSID and the preconfigured firewall rules is only associated with the wireless router and the wireless connection device. In step 314, wireless connection device is automatically connected to the wireless router based on the virtual SSID and the preconfigured firewall rules. In step 318, the wireless connection device is disconnected from the wireless router and it is determined that the wireless communication device comprises a transient device. In step 320, the wireless router deletes the private virtual network (including the virtual SSID and the preconfigured firewall rules and step 300 is repeated. Additionally, the wireless connection device may generate an updated virtual network comprising an updated virtual SSID and updated preconfigured firewall rules. The updated virtual network differs from the original virtual network. In response, the original unique data may be removed from the scannable tag and the updated virtual SSID and updated preconfigured firewall rules may be placed on the scannable tag for future connection usage.

Figure 4:
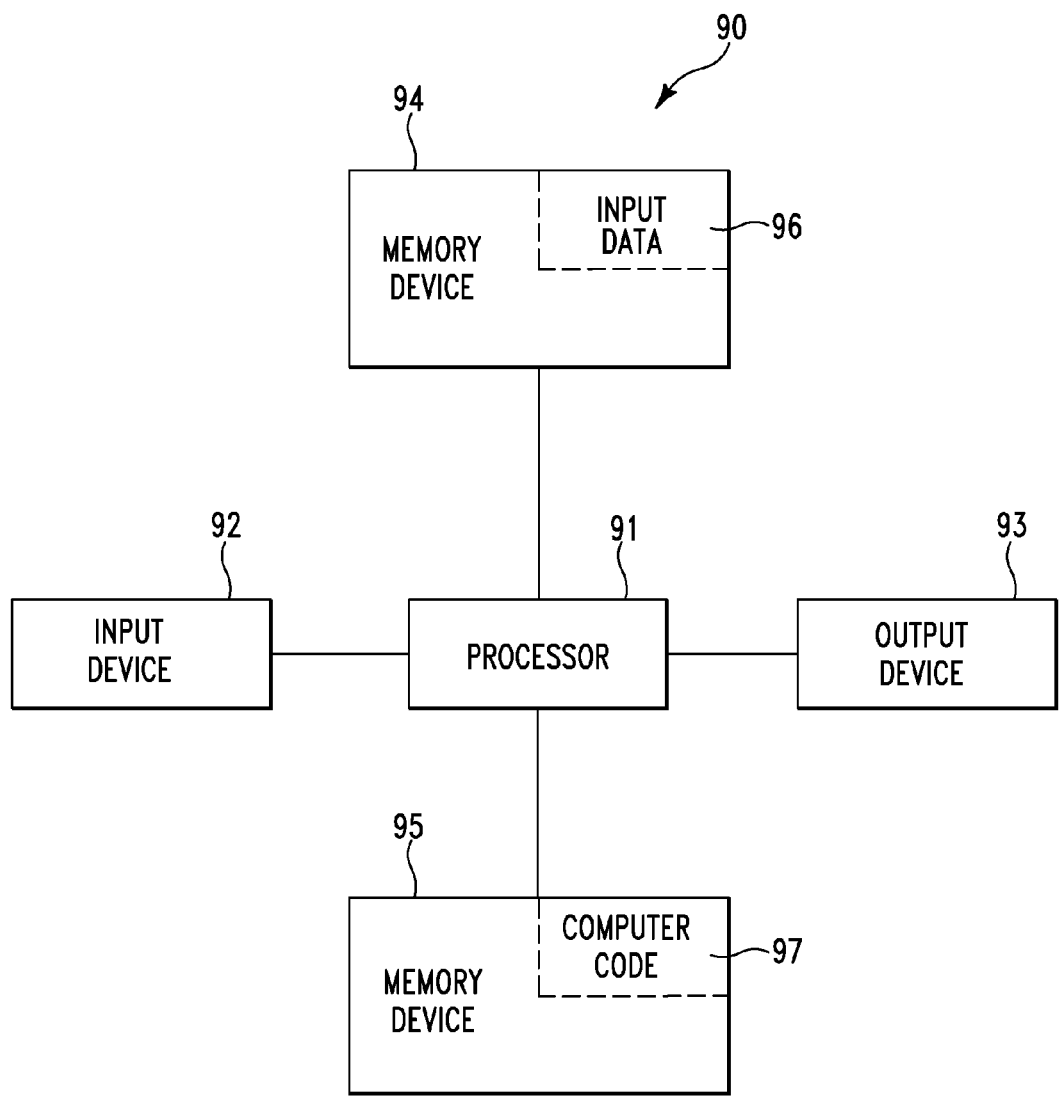
FIG. 4 illustrates a computer apparatus used by the system of FIG. 1 for enabling an automatic configuration and connection of a wireless device to a wireless router, in accordance with embodiments of the present invention.

FIG. 4 illustrates a computer apparatus 90 (e.g., any of the devices of FIG. 1) for enabling an automatic configuration and connection of a wireless connection device to a wireless router, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling an automatic configuration and connection of a wireless connection device to a wireless router. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to enable an automatic configuration and connection of a wireless connection device to a wireless router. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling an automatic configuration and connection of a wireless connection device to a wireless router. In another embodiment, the invention provides a business method that performs the process steps of the invention on a subscription, advertising, and/or fee basis. That is, a service supplier, such as a Solution Integrator, could offer to enable an automatic configuration and connection of a wireless connection device to a wireless router. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   retrieving from a wireless device, by a computer processor of a data retrieval device, unique data comprising an identifier identifying said wireless device;
   transmitting, by said computer processor, said unique data to a wireless router, wherein said wireless router transmits an authorization notification and a configuration request for a configuration change to an authorization service;
   receiving, by said computer processor in response to an authorization request presented to a user, an authorization code from said user; and
   transmitting, by said computer processor to said authorization service, said authorization code, wherein said authorization service transmits an authorization approval, based on said authorization code, to said wireless router, wherein said wireless router generates a virtual SSID and preconfigured firewall rules based on said unique data, wherein said virtual SSID and said preconfigured firewall rules are configured for use with only said wireless router and said wireless device, and wherein said wireless device is automatically connected to said wireless router based on said virtual SSID and said preconfigured firewall rules.

2. The method of claim 1, wherein said wireless device is disconnected from said wireless router, wherein it is determined that said wireless communication device comprises a transient device, and wherein said wireless router deletes said virtual SSID and said preconfigured firewall rules.

3. The method of claim 1, wherein said wireless router generates a virtual wireless network comprising said virtual SSID and preconfigured firewall rules.

4. The method of claim 1, wherein said unique data is located on a rewritable/scannable tag integrated with said wireless device, wherein said wireless device is disconnected from said wireless router, wherein said wireless device generates an updated virtual SSID and updated preconfigured firewall rules differing from said virtual SSID and said preconfigured firewall rules, wherein said unique data is removed from said rewritable/scannable tag, and wherein said updated virtual SSID and updated preconfigured firewall rules are placed on said rewritable/scannable tag.

5. The method of claim 1, wherein said unique data comprises product information describing said wireless device.

6. The method of claim 1, wherein said unique data comprises data selected form the group consisting of RFID tag data, encoded barcode data, and quick response code (QR) data.

7. The method of claim 1, wherein said data retrieval device comprises a device selected from the group consisting of a barcode reader, an RFID reader, quick response code (QR) reader, and a smart phone.

8. The method of claim 1, further comprising:
providing at least one support service for at least one of creating, integrating, hosting, maintaining, and deploying computer-readable code in the computing system, said code being executed by the computer processor to implement said retrieving, said transmitting said unique data, said receiving said authorization request, said presenting, said receiving said authorization code, and said transmitting said authorization code.

9. A method comprising:
retrieving from a rewritable/scannable tag integrated with a wireless device, by a computer processor of a data retrieval device, unique data comprising an identifier associated with said wireless device;
transmitting, by said computer processor in response to an authorization request transmitted to a wireless router, said unique data to a wireless router, wherein said wireless router determines that said wireless device is authorized for connection to said wireless router based on said authorization request and said unique data;
transmitting, by said computer processor to said wireless router, a connection command, wherein said wireless router generates a virtual wireless network comprising a virtual SSID and preconfigured firewall rules based on said unique data and in response to said connection command, wherein said virtual wireless network, said virtual SSID, and said preconfigured firewall rules are only configured for use with said wireless router and said wireless device, and wherein said wireless device is automatically connected to said wireless router via said virtual wireless network based on said virtual SSID and said preconfigured firewall rules.

10. The method of claim 9, wherein said wireless device is disconnected from said wireless router, wherein it is determined that said wireless communication device comprises a transient device, and wherein said wireless router deletes said virtual SSID and said preconfigured firewall rules.

11. The method of claim 9, wherein said unique data comprises product information associated with said wireless device.

12. The method of claim 9, wherein said unique data comprises data selected form the group consisting of RFID tag data, encoded barcode data, and quick response code (QR) data.

13. The method of claim 1, wherein said data retrieval device comprises a device selected from the group consisting of a barcode reader, an RFID reader, quick response code (QR) reader, and a smart phone.

14. A computer program product for configuring a connection, the computer program product comprising:
one or more computer-readable, tangible storage devices;
program instructions, stored on at least one of the one or more storage devices, to retrieve by a computer processor of a data retrieval device, unique data comprising an identifier associated with a wireless device;
program instructions, stored on at least one of the one or more storage devices, to transmit said unique data to a wireless router, wherein said wireless router transmits an authorization notification and a configuration request for a configuration change to an authorization service;
program instructions, stored on at least one of the one or more storage devices, to receive, in response to an authorization request presented to a user, an authorization code from said user in response to said authorization request; and
program instructions, stored on at least one of the one or more storage devices, to transmit said authorization code to said authorization service, wherein said authorization service transmits an authorization approval, based on said authorization code, to said wireless router, wherein said wireless router generates a virtual SSID and preconfigured firewall rules based on said unique data, wherein said virtual SSID and said preconfigured firewall rules are configured for use with only said wireless router and said wireless device, and wherein said wireless device is automatically connected to said wireless router based on said virtual SSID and said preconfigured firewall rules.

15. The computer program product of claim 14, wherein said wireless device is disconnected from said wireless router, wherein it is determined that said wireless communication device comprises a transient device, and wherein said wireless router deletes said virtual SSID and said preconfigured firewall rules.

16. The computer program product of claim 14, wherein said wireless router generates a virtual wireless network comprising said virtual SSID and preconfigured firewall rules.

17. The computer program product of claim 14, wherein said unique data is located on a rewritable/scannable tag integrated with said wireless device, wherein said wireless device is disconnected from said wireless router, wherein said wireless device generates an updated virtual SSID and updated preconfigured firewall rules differing from said virtual SSID and said preconfigured firewall rules, wherein said unique data is removed from said rewritable/scannable tag, and wherein said updated virtual SSID and updated preconfigured firewall rules are placed on said rewritable/scannable tag.

18. The computer program product of claim 14, wherein said unique data comprises product information describing said wireless device.

19. The computer program product of claim 14, wherein said unique data comprises data selected form the group consisting of RFID tag data, encoded barcode data, and quick response code (QR) data.

20. The computer program product of claim 14, wherein said data retrieval device comprises a device selected from the group consisting of a barcode reader, an RFID reader, quick response code (QR) reader, and a smart phone.

* * * * *